April 19, 1960     J. F. SCHMIDLIN     2,932,998
DEVICE FOR REMOVING A CONICAL ELEMENT FROM ITS
HOLDER, ESPECIALLY FOR A MACHINE TOOL
Filed Feb. 1, 1957
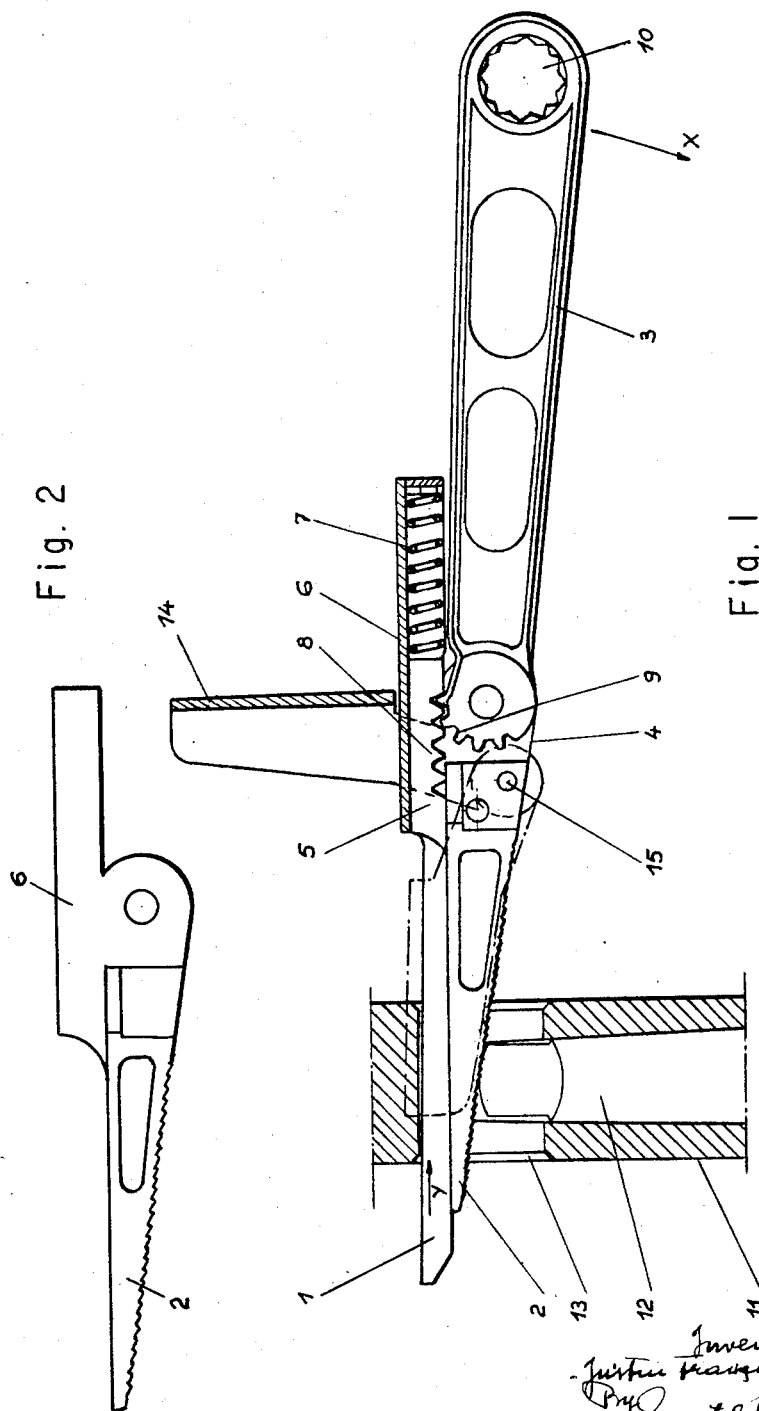

United States Patent Office 2,932,998
Patented Apr. 19, 1960

2,932,998

DEVICE FOR REMOVING A CONICAL ELEMENT FROM ITS HOLDER, ESPECIALLY FOR A MACHINE TOOL

Justin François Schmidlin, Mulhouse, France

Application February 1, 1957, Serial No. 637,809

Claims priority, application France February 7, 1956

2 Claims. (Cl. 81—3)

The present invention relates to a device for removing a conical element from its holder, for example a tool from a mandrel of a machine tool that is to say, a device for the expulsion of the conical shaft of a tool such as a drill, cutter, reamer or the like from the truncated mandrel of a machine spindle, or from a reduction cone. One known device for this purpose comprises two abutting wedges, preferably of opposite inclination, which wedges are adapted to be displaced longitudinally relative to one another by means of a lever or a handle, this mutual longitudinal displacement of the wedges being obtained by a rocking of the lever after the manner of a toggle joint.

It is one object of the present invention to provide a device for removing a conical element from its holder which comprises two abutting wedges displaceable longitudinally relative to one another so as to increase their combined width by means of an operating member which includes means for automatically returning the wedges to their initial relative positions of minimum combined width after they have been displaced for a removing operation. The means for automatically returning the wedges to their initial relative positions is advantageously arranged on that wedge which, by its longitudinal displacement relative to the other wedge, the latter remaining stationary relative to the tool, causes disengagement and expulsion of the conical element from its holder. The said means comprises preferably a slide provided on the movable wedge, which slide moves in a guide arranged on the fixed wedge and is engaged by a spring located in the said guide.

It is yet another object of the present invention to provide a device as stated above, wherein the control lever is pivoted on the fixed wedge and teeth on the control lever cooperate with a rack provided on the displaceable wedge.

Moreover, the control lever may be provided with a polygonal or notched orifice adapted to form a wrench.

Preferably the surface of the fixed wedge which comes into contact with the conical element to be removed is provided with serrations which prevent slipping of the said wedge.

It is still a further object of the present invention to provide a device as set forth above, wherein the fact is taken into account that, in practice, there exists for tools with conical shafts, a series of standard cones of different dimensions and that likewise there exists either in the machine tool spindles or in the reduction cones a series of corresponding conical bearings. In order that the device may be used for the removal of all the standard cones, whatever their size, it may be provided with a means permitting variation, as required, of the thickness and overall combined width of the fixed and movable wedges in order that they may be adapted to different dimensions of a conical element and holder.

Such means for permitting variation of thickness and width of the wedges may comprise a tongue capable of being positioned adjacent the wedges, and said tongue may be pivotally mounted on the fixed wedge so as to be capable of being moved as required, to a position abutting the two wedges or to a position removed from the said wedges.

Advantages of the device according to the invention are a more rapid and easier handling of the device than the prior known devices; the possibility of using the device also as a spanner for tightening and loosening nuts; and the fact that, due to the provision of the tongue, a single device suffices generally for all the cones of the standard series.

With these and other objects in view which will become apparent in the following detailed description, the present invention will be clearly understood in connection with the accompanying drawing, in which:

Figure 1 is a side elevation of a device partly in section and constructed in accordance with the invention, showing the same in position ready for releasing a tool from a machine tool mandrel; and Fig. 2 is a disassembled view of the fixed wedge integral with the guide.

Referring now to the drawing, the present device comprises a movable wedge 1, and a fixed wedge 2, the latter tapering with opposite inclination to the wedge 1. A control lever 3 of the device is pivotally arranged on an extension 4 of the fixed wedge 2. The movable wedge 1 is integral with or secured to a slide 5 which slides in a guide 6 which is integral with the fixed wedge 2. In this guide is located a spring 7. A rack 8 is cut in the slide 5, which rack 8 is in engagement with a toothed sector 9 provided on the adjacent end of the control lever 3. A notched orifice 10 in the control lever 3 permits the latter, when required, to operate as a wrench. Also illustrated is part of a machine tool mandrel 11 in which is disposed a conical shaft 12 of a tool which is accessible, for expulsion, through a slot 13 in the mandrel 11. That face of the fixed wedge 2 which comes into contact with the shaft 12 is serrated to avoid slipping or movement of the wedge 2 during the longitudinal displacement (as will later be explained) of the movable wedge 1 by the lever 3.

In order to disengage and expel the conical shaft 12 of the tool from the mandrel 11, the two superimposed wedges 1, 2 of the device are introduced into the slot 13 of the mandrel as illustrated until the serrated face of the fixed wedge 2 engages the rear end of the shaft 2 and the remote face of the movable wedge 1 engages the confronting face of the mandrel 11. Pivotal movement, in the direction of arrow $x$, is imparted to the control lever 3 by a blow with the hand. This results in a displacement of the movable wedge 1 in the direction of arrow $y$ relative to the fixed wedge 2 and compression of the spring 7 by the slide 5. The movement of the movable wedge 1 relative to the fixed wedge 2 causes a thrust on the end of the conical shaft 12 sufficient to disengage it from the mandrel 11. When the control lever 3 is released the movable wedge 1 returns to its initial illustrated position due to the action of the spring 7 which forces the slide 5 back to the position shown.

A tongue 14, with which the device is also provided, is pivotally mounted at 15 on the fixed wedge 2 and for the operation described above, positioned as shown so as to be clear of the wedges 1 and 2. Where the dimensions of the slot 13 in the mandrel 11 and of the tool cone 12 to be removed are such that the space between the end of the tool and the confronting face of the mandrel slot 11 is greater than the maximum combined widths of the wedges 1, 2, the tongue 14 may be moved to the position in dot and dash lines adjacent the wedges 1, 2 the height and thickness of which is then increased so that the device can be used for the expulsion of the tool.

While I have disclosed several embodiments of the present invention, it is to be understood that these embodiments are given by example only and not in a limiting sense, the scope of the present invention being determined by the objects and the claims.

I claim:

1. A device for driving a conical tool out of a tool holder carrying the said tool in a conical recess thereof and having a slot disposed behind the rear end of said tool, the said slot being adapted to receive said device, comprising two longitudinal tapered wedge members slidingly engaging each other, the taper of one of said tapered wedge members being disposed in opposite direction to that of the other of said members, and means for sliding one of the said tapered wedge members relative to the other of the said tapered members in order to increase the distance between outer edges of the said two tapered wedge members, and, thereby, to remove said tool from the tool holder, and longitudinal and lateral guide means disposed on one of said tapered wedge members and comprising a slide, and a guide disposed on the other of said tapered wedge members and receiving said slide, in order to guide one of said tapered wedge members along the other of said tapered wedge members, and said means for sliding comprising an operating lever, and said slide having first teeth to form a rack portion and said operating lever having complementary second teeth co-operating with said rack teeth, so that, upon turning said operating lever, said slide and said tapered wedge member connected therewith moves relative to the other of said tapered wedge members.

2. A device for driving a conical tool out of a tool holder carrying the said tool in a conical recess thereof and having a slot disposed behind the rear end of said tool, the said slot being adapted to receive said device, comprising two longitudinal tapered wedge members slidingly engaging each other, the taper of one of said tapered wedge members being disposed in opposite direction to that of the other of said members, and means for sliding one of the said tapered wedge members relative to the other of the said tapered members in order to increase the distance between outer edges of the said two tapered wedge members, and, thereby, to remove said tool from the tool holder, and longitudinal and lateral guide means disposed on one of said tapered wedge members and comprising a slide, and a guide disposed on the other of said tapered wedge members and receiving said slide, in order to guide one of said tapered wedge members along the other of said tapered wedge members, and said means for sliding comprising an operating lever, and varying means comprising a tongue pivoted to one of said tapered wedge members and capable of being positioned into abutting position with said tapered wedge members in order to permit the use of said device with tool holders of different sizes.

References Cited in the file of this patent
UNITED STATES PATENTS

| | | |
|---|---|---|
| 1,609,732 | McLaughlin et al. | Dec. 7, 1926 |
| 2,215,015 | Richard | Sept. 17, 1940 |
| 2,394,845 | Cothern | Feb. 12, 1946 |
| 2,706,920 | Unterrährer | Apr. 26, 1955 |
| 2,747,448 | McCafferty | May 29, 1956 |
| 2,819,636 | Woerner | Jan. 14, 1958 |